US011933151B2

(12) United States Patent
Rivas et al.

(10) Patent No.: US 11,933,151 B2
(45) Date of Patent: Mar. 19, 2024

(54) INSTALLATION FOR THE STORAGE AND USE OF WATER-SOLUBLE POLYMERS

(71) Applicant: SNF Group, Andrezieux Boutheon (FR)

(72) Inventors: Christophe Rivas, Andrezieux Boutheon (FR); Nicolas Chalieux, Andrezieux Boutheon (FR)

(73) Assignee: SNF Group, Andrezieux Boutheon (FR)

( * ) Notice: Subject to any disclaimer, the term of this patent is extended or adjusted under 35 U.S.C. 154(b) by 0 days.

(21) Appl. No.: 18/098,951

(22) Filed: Jan. 19, 2023

(65) Prior Publication Data

US 2023/0228176 A1 Jul. 20, 2023

(30) Foreign Application Priority Data

Jan. 20, 2022 (FR) ...................................... 2200495

(51) Int. Cl.
*E21B 43/20* (2006.01)
*B65D 88/54* (2006.01)
*C09K 8/588* (2006.01)

(52) U.S. Cl.
CPC .............. *E21B 43/20* (2013.01); *B65D 88/54* (2013.01); *C09K 8/588* (2013.01)

(58) Field of Classification Search
CPC ................................ E21B 43/20; C09K 8/588
See application file for complete search history.

(56) References Cited

U.S. PATENT DOCUMENTS

| 5,823,670 A * | 10/1998 | Rushing ................. B01F 23/49 137/3 |
| 7,814,977 B2 * | 10/2010 | Pich ........................ E21B 43/16 166/305.1 |
| 8,360,152 B2 * | 1/2013 | DeFosse ............... E21B 43/267 166/308.2 |
| 8,444,312 B2 * | 5/2013 | Hagan ................... E21B 21/062 366/181.8 |
| 8,864,365 B2 * | 10/2014 | Rodgers ................. B01F 25/50 366/150.1 |

(Continued)

FOREIGN PATENT DOCUMENTS

| WO | WO2011031485 A2 | 3/2011 |
| WO | WO2011107683 A1 | 9/2011 |

(Continued)

OTHER PUBLICATIONS

Thomas, S. "Enhanced Oil Recovery—An Overview"; Oil & Gas Science and Technology—Rev. IFP, vol. 63 (2008), No. 1, pp. 9-19.

*Primary Examiner* — Matthew R Buck
(74) *Attorney, Agent, or Firm* — FORGE IP, PLLC (57) ABSTRACT

An installation for storing, metering, and dissolving water-soluble polymer particles, in particular for enhanced oil and/or gas recovery operations, includes a so-called "polymer dissolution" container A and at least one so-called "polymer storage and distribution" container B positioned upon container A. The bottom of container B and the roof of container A each have an opening facing one another allowing the passage of the polymer from container B into the supply mechanism of container A. The installation further includes a connection mechanism able to work with the polymer supply mechanism.

15 Claims, 4 Drawing Sheets

(56) References Cited

U.S. PATENT DOCUMENTS 11,148,106 B2 * 10/2021 Liu .................... B01F 25/31243
2009/0095481 A1 * 4/2009 Pich ........................ B02C 18/08
                                                                    241/38
2019/0217258 A1     7/2019 Bishop

FOREIGN PATENT DOCUMENTS

WO     WO2016156320 A1    10/2016
WO     WO2017171797 A1    10/2017

* cited by examiner

INSTALLATION FOR THE STORAGE AND USE OF WATER-SOLUBLE POLYMERS

TECHNICAL FIELD

This invention relates to an installation for the storage, metering, and dissolution of water-soluble polymer particles. It also relates to a method implementing the installation, in particular for enhanced oil and/or gas recovery operations.

PRIOR ART

Most of the oil fields currently in operation have matured, and their production has, in fact, started to decline or are about to do so. The recovery rate of these fields is currently around 15 to 35% on average compared to the initial quantity of oil. They, therefore, offer considerable production potential.

In general, the recovery of the crude oil contained in the deposits is carried out in several stages.

First of all, the production results from the natural energy of the fluids and from the rock, which is decompressed. At the end of this depletion phase, the quantity of oil recovered on the surface represents, on average, some 5 to 15% of the initial reserve. It is, therefore necessary, in a second step, to employ techniques aimed at increasing the recovery yield by maintaining the field pressure.

The method most frequently implemented consists of injecting water into the deposit through injection wells dedicated to this purpose. This is called secondary recovery. This second phase stops when the water/oil ratio is too high, i.e., when the quantity of water in the mixture produced by the producing wells is too high. This secondary recovery thus makes it possible to obtain an additional recovery rate on the order of 10 to 20%.

Other techniques that may be used are grouped under the name of EOR, an acronym for "Enhanced Oil Recovery". Their goal is to recover between 10 and 35% of additional oil compared to the initial quantity of oil. Under the term enhanced oil recovery, various thermal or non-thermal techniques are known, such as the so-called electric, miscible, steam, or even chemical techniques for improved recovery of oil remaining in place (see "Oil & gas science and technology"—IFP review, vol. 63 (2008) No. 1, pp 9-19).

The term "petroleum" is understood to mean any type of oil, namely light oil as well as heavy oil, or even bituminous. An oil generally results from the natural transformation of organic matter and is composed of a mixture of hydrocarbons. In the description of the prior art or of the invention, the terms petroleum and oil are used to denote the same material, except when the composition mentioned is of an emulsion or a dispersion.

The effectiveness of water injection sweeping is generally improved by the addition of water-soluble polymers. The expected and proven benefits of using water-soluble polymers, through "viscosification" of the injected water, are improving the sweeping and reducing the viscosity contrast between the fluids to control their mobility ratio in the field, to recover the oil quickly and efficiently.

These water-soluble polymers may be in liquid form, for example, in the form of a dilute solution, or of an inverse emulsion, or else in the form of particles.

The use of the water-soluble polymer in the form of a dilute solution or in the form of an inverse emulsion suffers from numerous negative aspects, such as for example, a quantity of active material (polymer) present in the liquid which is low relative to the weight of the liquid, which increases the cost of transport and the space required for their storage. Additionally, the liquid form may be susceptible to freezing and bacterial contamination, and in the event of a spill, the liquids are not easily contained and significantly contaminate the environment. The production costs of liquid water-soluble polymers are also significantly more expensive and therefore almost always exclusively reserved for offshore fields (platforms or factory vessels) where handling the powder form may be more complicated.

For these reasons, water-soluble polymers are often stored in the form of particles before being dissolved and used in the form of an aqueous solution.

Since space is limited for onshore fields and even more so for offshore fields, the number and size of storage and dissolution installations for water-soluble polymers must be minimized. This also meets the need to simplify and reduce the cost of enhanced oil and/or gas recovery operations.

In addition, the dissolution of polymers in the form of particles must be optimal to ensure all the qualities required of the final aqueous solution to be injected, whether in terms of concentration, absence of insolubles, and/or gels, in order to not impact the performance of the enhanced oil and/or gas recovery process.

The size of the oil fields being variable and the quantity of water-soluble polymer to be injected also varying in the life of a well, the storage installations must be adapted to each field involving complex logistical means, which it is difficult to simplify. In particular, it is essential to provide for perfect continuity at the level of injection without interruption of the supply of water-soluble polymer, whatever the logistical, climatic, technical, or even social hazards.

Currently, water-soluble polymers in the form of particles are mainly stored in vertical hoppers. This equipment is bulky, and it is necessary to have it custom-made locally because transporting it is difficult and expensive. It is the same for their field installation.

These hoppers are generally on feet and require specific foundations that must be made in the field, which is never easy on an oil field. In addition, in these hoppers, the water-soluble polymer tends to accumulate on the walls, in particular, because of their rise in temperature, which affects the quality of the polymer. It is then necessary to install sun visors or expensive insulation systems, which are not always very effective.

Manufacturers are looking for improvements and optimizations of the conditions and means with which to store their polymers using systems that are as integrated as possible in order to simplify their installation as well as the cost associated with it and to reduce their storage footprint.

Storage and dissolution installations for solid compounds are described in particular in documents US 2019/217258, WO 2011/031485 and WO 2017/171797.

The applicant has developed new equipment that is easily modular, removable, and easily transportable in order to meet the different needs of oil tankers. The new equipment is easy to install, inexpensive and makes a reduced footprint possible for storing, metering, and dissolving water-soluble polymer.

The gravity integration between the silo and the equipment for dispersing water-soluble polymer particles into the dissolution water is a guarantee of system reliability and robustness.

The invention is part of a general principle of reducing greenhouse gas emissions such as $CO_2$ associated with the transport and storage of polymers.

Presentation of the Invention

The subject-matter of the invention is an installation for the storage, metering, and dissolution of water-soluble polymer particles, in particular for enhanced oil and/or gas recovery operations comprising a container A of generally parallelepiped shape called "for dissolution of the polymer" comprising side walls forming long and short sides, a bottom and a roof, said container A comprising at least one means for supplying the polymer, at least one means for metering the polymer, and at least one means for dissolving the metered polymer.

The installation is characterized in that it further comprises at least one container B of a generally parallelepipedic shape called "polymer storage and distribution" positioned on container A comprising side walls forming long and short sides, a roof, and a bottom, in that the bottom of the container B and the roof of the container A, each have an opening facing each other capable of allowing the polymer of container B to pass through at least one means of polymer supply from container A, in that the bottom of container B comprises a means for setting the polymer in motion in the form of a horizontal screw, the installation further comprising a connection means capable of working with the at least one polymer supply means (1).

According to this invention, the term "polymer" designates a homopolymer or a copolymer, a copolymer designating a polymer prepared from at least two different monomers. It is, therefore, a copolymer of (i) at least one anionic monomer and/or (ii) of at least one other cationic monomer and/or (iii) of at least one nonionic monomer and/or (iv) at least one zwitterionic monomer.

The term "water-soluble polymer" denotes a polymer that gives an aqueous solution without insoluble particles when it is dissolved with stirring for 4 hours at 25° C. and with a concentration of 5 gl-1 in deionized water.

The term "particle form" denotes the forms of powder, bead, agglomerate, or a mixture.

In practice, containers A and B and, in general, all the containers to which this invention refers, each takes the form of an intermodal container, corresponding to a standardized shipping container designed and built for intermodal freight transport. This means that these containers may be used across different modes of transport, from ship to train to truck, without unloading and reloading their cargo.

Insofar as the containers are standardized, this implies that they have the same size, i.e., the same volume, and therefore walls, each of the same surface. As a result, container A and container B overlap each other over the entire surface of the roof of container A and the bottom of container B, respectively.

To enable continuous operation of the system, this system also includes at least one additional storage container.

In a first embodiment, the installation comprises only one additional container.

In one case, the additional container is in the form of container C, called polymer "storage-only". Unlike containers A and B, it is devoid, at least partially, of a bottom. In other words, it has a removable bottom which, for example, is at least partially removed when constructing the installation.

In this embodiment, container B has no roof, and container C is positioned upon container B so as to only allow the transfer of the polymer from storage-only container C to storage and distribution container B.

In another case, the additional container is in the form of container B', i.e., a polymer storage and distribution container identical in terms of dimensions in particular, to container B, the containers B and B' being positioned side by side along their long side, i.e., adjacently.

In this embodiment, container B' is positioned on a so-called "management" container D, or a structure capable of supporting its weight.

In this embodiment, one of the sidewalls of container A has an opening communicating with the opening placed in the bottom of container B' through a means of connection capable of allowing the passage of the polymer from container B' in the at least one polymer supply means of container A.

In a second embodiment, the installation comprises 3 additional containers respectively:
- an additional container appearing, as described above, in the form of container B', i.e., a polymer storage and distribution container identical to container B, containers B and B' being positioned side by side along their long side, i.e., adjacently,
- 2 additional containers presenting as described above in the form of container C and container C' comprising side walls forming long and short sides and a roof, said containers C and C' being at least partially devoid of a bottom, containers C and C' being respectively positioned on containers B and B', so as to only allow the transfer of the polymer from storage-only containers C and C', and to containers B and B' for storage and distribution.

According to another characteristic, container B, and if necessary, container B', C, and C' are advantageously provided with self-cleaning filters.

According to another characteristic, the polymer storage and distribution container(s) and/or, where appropriate, the storage-only container(s) (container B, B', C, and C') comprises a means to prevent the water-soluble polymer from accumulating and remaining stuck to the walls, for example, an interior coating, in particular a stainless steel sheet.

In the case of polymer storage and distribution container(s) (B, B'), the general shape of the stainless steel sheet is that of a funnel having a vertical upper part extending over the side surfaces of the container and a lower part inclined towards the horizontal screw (4) forming an angle of between 30 and 70°, more preferably between 45 and 60° with respect to the horizontal.

In the case of storage-only container(s) (C, C'), the stainless steel sheet covers the entire surface of the available walls.

The horizontal screw allows the polymer present in the storage container to be set in motion by mechanical action and to be conveyed towards the opening arranged at the bottom of said storage container, allowing the polymer to be transferred into the dissolution container.

The positioning of the horizontal screw in the storage container makes it possible to carry out, via the same module, the functions of storage and distribution of the polymer by mechanically moving it towards the opening leading to the underlying container.

This makes it possible to assemble the storage module with any polymer dissolution/processing module, in particular such a module without means for moving the polymer, which brings flexibility and practicality of use to the modular installation.

This is also particularly useful when the storage container is large in front of said opening (of a large horizontal parallelepipedic shape for example). The presence of a screw arranged directly in the storage container indeed allows the solid to circulate along the entire length of said container, and thus avoid an undesired accumulation of polymer therein that would generate polymer losses.

Preferably, the installation has no means of moving the polymer, in particular in the form of a horizontal screw, into the polymer dissolution container.

Preferably, the roof of the "polymer storage and distribution" container B is removable This invention also relates to a process for producing a water-soluble polymer solution using the previously described installation and comprising the following steps:
- the water-soluble polymer in powder form is fed into the polymer storage-only container or optionally into the polymer storage, and distribution container by a supply means;
- it is then set in motion by the horizontal screw located at the bottom of said storage and distribution container;
- the water-soluble polymer then passes through the opening at the bottom of said storage and distribution container and the opening in the roof of the dissolution container;
- the water-soluble polymer goes into the polymer feeder, in practice the hopper, and then into the metering means, in practice the metering screw;
- it is then sent to the dissolving means;
- it then passes optionally through a hydration and dissolution tank equipped with a stirring system;
- finally, it is optionally fed into a volumetric metering pump that meters the water-soluble polymer solution to be mixed with the injection fluid.

This invention also relates to an enhanced oil and/or gas recovery process comprising the following steps:
- storage, metering, and dissolution of a water-soluble polymer in the installation described above,
- preparation of an injection fluid comprising at least said water-soluble polymer and water or brine,
- injection of the injection fluid into an underground formation,
- sweeping of the underground formation using the injected fluid,
- recovery of an aqueous and hydrocarbon mixture.

BRIEF DESCRIPTION OF THE DRAWINGS

Other advantages and characteristics will be better understood from the following description, given by way of a non-limiting example, of the installation according to the invention, from the appended drawings in which.

DETAILED DESCRIPTION OF THE INVENTION

Dissolution Container A (Container A)

In general, the dissolution container A and, more broadly, all the containers referred to in the invention have standard dimensions and can carry a net weight of between 1 and 20 tons. Preferably, the dissolution container has a dimension of 6 to 12 meters by 2.4 meters by 2.6 meters high without the frame and a weight of between 4 to 25 tons in displacement to meet local requirements.

According to the invention, container A comprises at least one polymer supply means (1), at least one means (2) for metering the polymer, and at least one means for dissolving (3) the metered polymer.

As shown in the Figures, the polymer supply means (1) is in the form of a hopper (1), and the polymer metering means (2) is in the form of a screw dispenser (2).

In other words, the water-soluble polymer feed (1) and metering (2) means comprise:
- a hopper (1) feeding a metering screw (2);
- a metering screw (2) feeding a device for dissolving water-soluble polymer (3).

The hopper (1) usually has a size of between 20 and 100 L. Preferably between 30 and 50 L.

The metering screw (2) has a flow rate of between 120 and 2000 kg/h, and this may be adapted according to the size of the fields and the need for the quantity of water-soluble polymer to be injected according to the application.

The device for dissolving water-soluble polymer (3) may be any type of device capable of dissolving a polymer, such as, for example, a venturi system or a device for dispersing polymer by grinding. Preferably, it is a device for dispersion by polymer grinding.

The device for dispersion by grinding of water-soluble polymer generally comprises:
- a wetting cone (3.1) of the water-soluble polymer particles connected to a primary water supply circuit,
- at the end lower part of the cone, a chamber for grinding and draining (3.2) the dispersed water-soluble polymer comprising:
- a rotor driven by a motor and fitted with knives, a fixed stator consisting of a cylinder fitted with fine slots,
- on all or part of the periphery of the chamber, a crown fed by a secondary water circuit, the crown communicating with the chamber so as to ensure the spraying of pressurized water on the outside of the stator, thus allowing the release of the crushed and swollen water-soluble polymer on the surface of said stator.

In one particular mode of the invention, the wetting cone of the water-soluble polymer particles has a coating that gives it a surface tension of between 7.5 and 19.5 mN·m$^{-1}$.

Generally, the device to dissolve the water-soluble polymer (3) has a dissolving capacity of between 5 and 3000 kg/h of water-soluble polymer particles adjustable according to the field and the application, more commonly between 50 and 650 kg/h of polymer particles.

As a device to grind a water-soluble polymer for dispersion, mention may be made of the "PSU" for "Polymer Slicing Unit" that the applicant has developed and which is described in document WO 2011/107683 or also WO 2016/156320.

Figure 1:
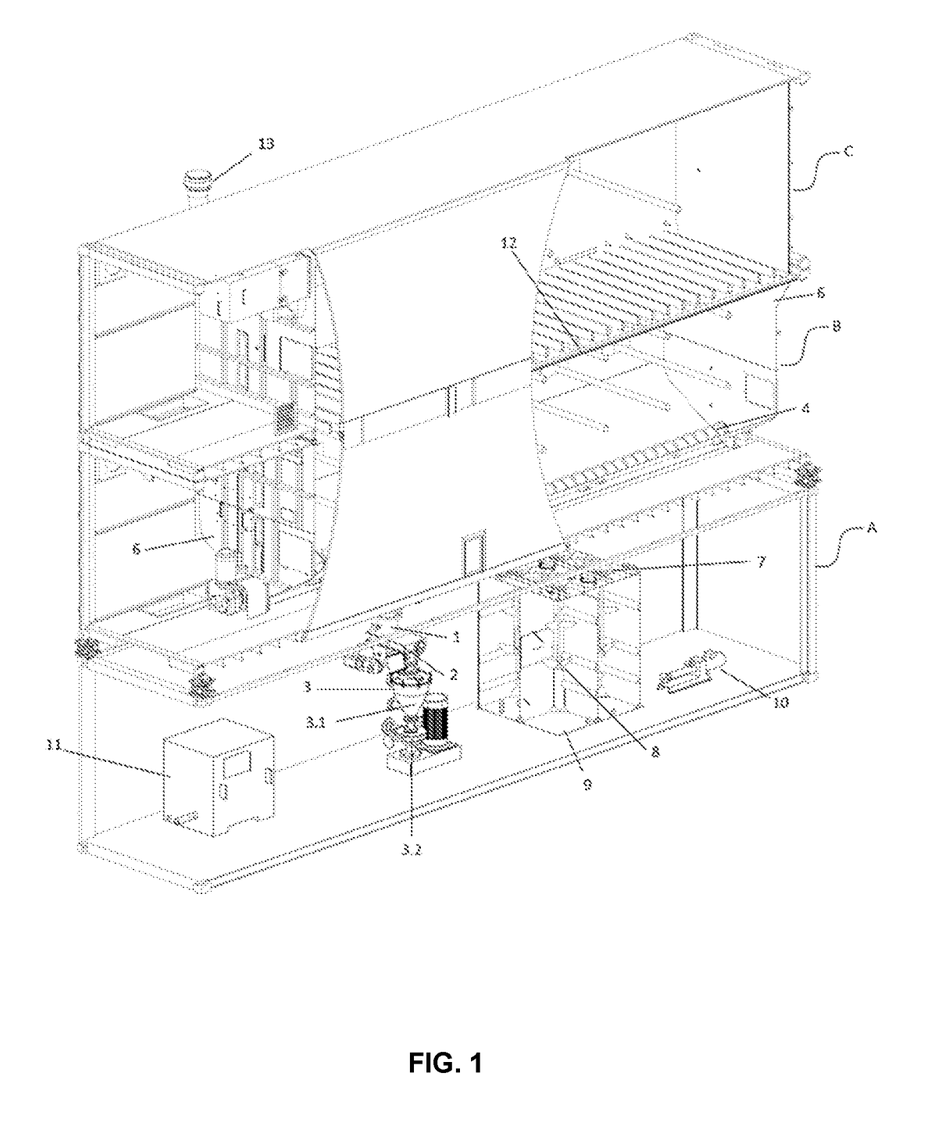
FIG. 1 is a schematic representation of a first embodiment of the installation according to the invention, which has 3 containers, one on top of the other, one dissolution container A and 2 storage containers B and C.
Figure 3:
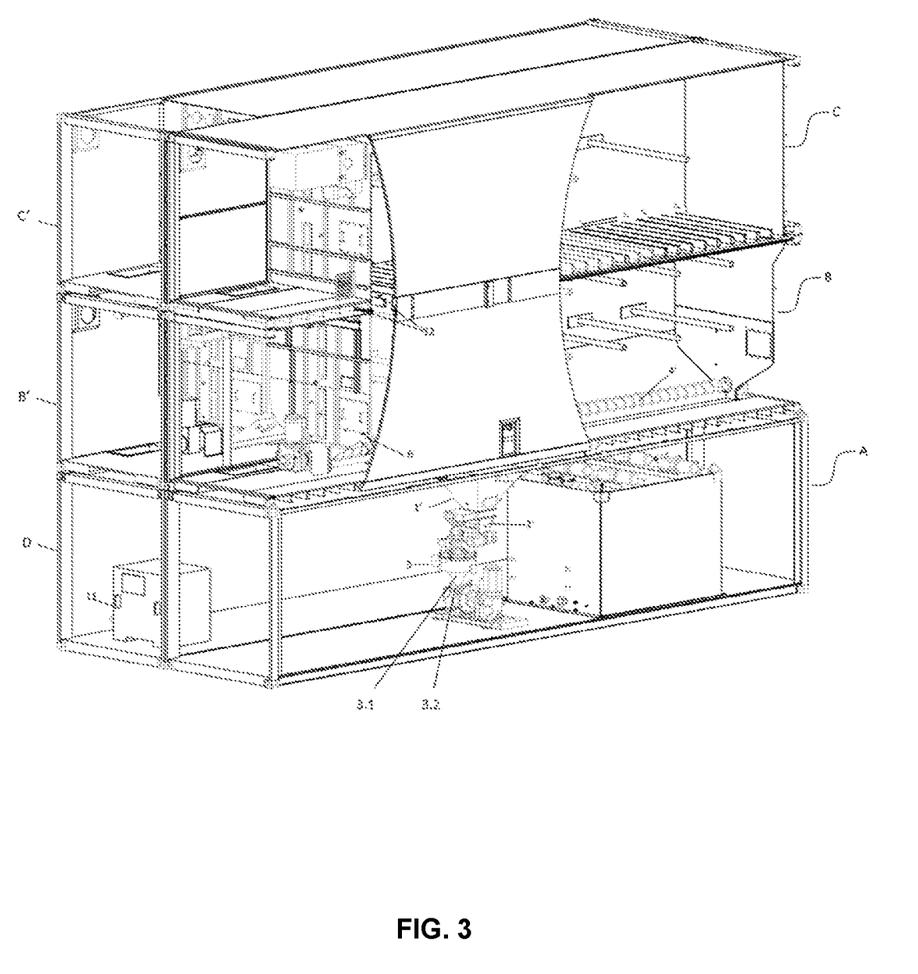
FIG. 3 is a schematic representation of a second embodiment of the installation according to the invention, which presents 2 contiguous series of 3 superimposed containers (respectively A, B and C, and D, B' and C').

As shown in the Figures, in particular FIGS. 1 and 3, container A further contains a hydration and dissolving tank (7) connected to the water-soluble polymer dissolution device (3), said tank being equipped with a stirring system (8) and generally having a size between 1 and 150 m$^3$, preferably between 4 and 60 m$^3$.

The hydration and dissolution tank (7) generally comprises several maturation chambers (9), preferably at least two, more preferably at least 3, even more preferably at least 4; it may contain more if necessary.

In one particular embodiment according to the invention, the dissolution container A may contain several hydration and dissolution tanks (7) in series. For example, it may contain two or three or more depending on the field requirements. The hydration and dissolution tanks (7) may be in series or in parallel; preferably, they are in series.

The number of maturation chambers (9) of each hydration and dissolution tank (7) may vary and may be adjusted by those skilled in the art as needed.

As shown in the Figures, in particular FIGS. 1 and 3, container A further contains at least one metering volumetric pump (10) connected to the hydration and dissolution tank (7).

In practice, the volumetric metering pump (10) is used to meter the quantity of dissolved water-soluble polymer to be mixed in the injection fluid. It generally has a flow rate of between 0.05 m$^3$/h and 40 m$^3$/h, preferably between 0.5 and 20 m$^3$/h.

Dissolution container A may comprise several metering volumetric pumps (10), for example, two or three or more, depending on the needs in the field.

As shown in the Figures, in particular FIGS. 1 and 3, container A also contains a control room (11) comprising the various flow management organs of the installation and the power generators as well as the ancillary devices to produce and process the utilities.

The control room (11) may include electrical protections, a programmable automaton, and various instruments that make it possible for continuous operation of the system. In addition, the center may be autonomous with a generator, a compressor, and telemetry or remote monitoring equipment.

Polymer B Storage and Distribution Container (Container B)

Storage and distribution container B is an intermodal container like dissolution container A; it, therefore, has the same characteristics.

The horizontal screw (4) located at the bottom of container B generally has a flow rate of between 1 and 6 m$^3$/h, preferably between 4 and 4.5 m$^3$/h.

Generally, container B comprises a means to prevent the water-soluble polymer from accumulating and remaining stuck to the walls, for example, an interior coating (6).

The term inner lining (6) denotes a layer of materials covering the sidewalls of the container and not present in the container initially. It is generally a structure of stainless sheet metal adapted to the contours of the container.

As shown, the stainless steel sheet is in the general form of a funnel with a vertical upper part extending over the side surfaces of the container and a lower part inclined towards the horizontal screw (4) at an angle of between 30 and 70°, more preferably between 45 and 600 with respect to the horizontal.

In one preferred embodiment, according to the invention, container B is provided with a self-cleaning filter. It may be an automatic mechanical or pneumatic cleaning system. Preferably, it is an automatic pneumatic unclogging filter.

In one particular embodiment, the installation, according to the invention comprises a second storage container.

It may be a storage-only container (container C) for polymer or a storage and distribution container (container B') similar to container B.

Polymer Storage-Only Container C (Container C)

Storage and distribution only container C is an intermodal container like dissolution container A; it, therefore, has the same characteristics.

Figure 2:
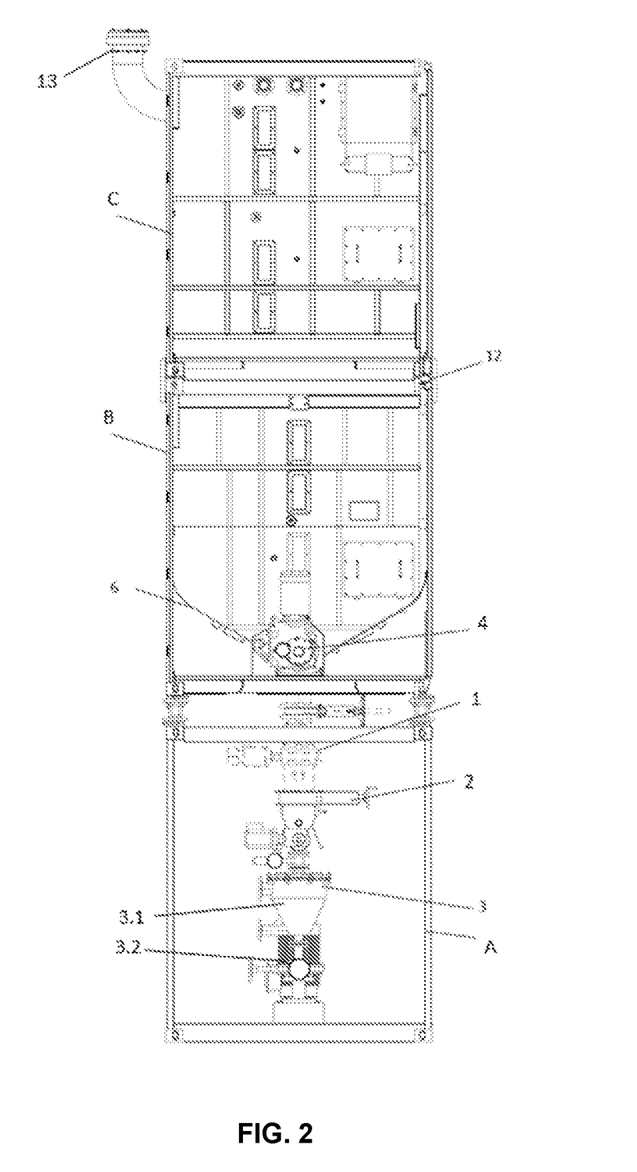
FIG. 2 is a cross-section of FIG. 1.

As shown in FIGS. 1 and 2, container C does not have a horizontal screw (4).

Container C is devoid, at least partially, of a bottom. In other words, it has a removable bottom which, for example, is at least partially removed when constructing the installation.

Generally, container C comprises a means to prevent the water-soluble polymer from accumulating and remaining stuck to the walls, for example, an interior coating (6).

The term inner lining (6) denotes a layer of materials covering the sidewalls of the container and not present in the container initially. It is usually a stainless steel sheet structure adapted to the contours of the container. In the case of container C, the stainless steel sheet covers the entire surface of available walls.

In one preferred mode according to the invention, container C is provided with a self-cleaning filter. It may be an automatic mechanical or pneumatic cleaning system. Preferably, it is an automatic mechanical or pneumatic cleaning system.

In this embodiment, container B has no roof, and container C is positioned on top of container B so as to allow the transfer of the polymer from container C to container B. Containers B and C are then hermetically connected so that they form a single continuous volume of large capacity.

For example, and without limitation, containers B and C are usually hermetically connected using welding, screws, seals, preferably using seals (12).

In one preferred mode, according to the invention, the seals (12) are press-fitted seals. Generally, at least 4 seals fitted together, more preferably at least 6, and even more preferably 8 seals fitted together are used. However, it is possible to use more seals.

Polymer Storage and Distribution Container B' (Container B)

Storage and distribution container B' is an intermodal container like dissolution container A; it, therefore, has the same characteristics.

Storage and distribution container B' has the same equipment as storage and distribution container B.

Container B' is adjacent to storage container B. It may be placed on management container D or on a structure capable of supporting its weight; generally, it is a metal structure.

Container B' also has, with respect to container B, at least one means of connection able to allow the passage of the polymer from the container B' into at least one supply means of container A. This is generally a screw or an inclined chute (5).

Polymer Storage-Only Container C' (Container C')

Polymer storage-only container C' is an intermodal container like the dissolution container A, so it has the same characteristics.

Polymer storage-only container C' has the same equipment as polymer storage-only container C.

In this embodiment, container B has no roof, and container C is positioned on container B so as to only allow the transfer of the polymer from storage container C to the storage and distribution container B. The containers B' and C' are then hermetically connected so that they no longer form a single continuous volume of large capacity.

Containers B' and C' are usually hermetically connected with, for example, and without limitation, welding, screws, seals, preferably using seals (12).

In one preferred mode according to the invention, the seals (12) are press-fitted seals. Generally, at least 4 seals fitted together, more preferably at least 6, and even more preferably, 8 seals fitted together, are used. However, it is possible to use more seals.

Management Container D (Container D)

Figure 4:
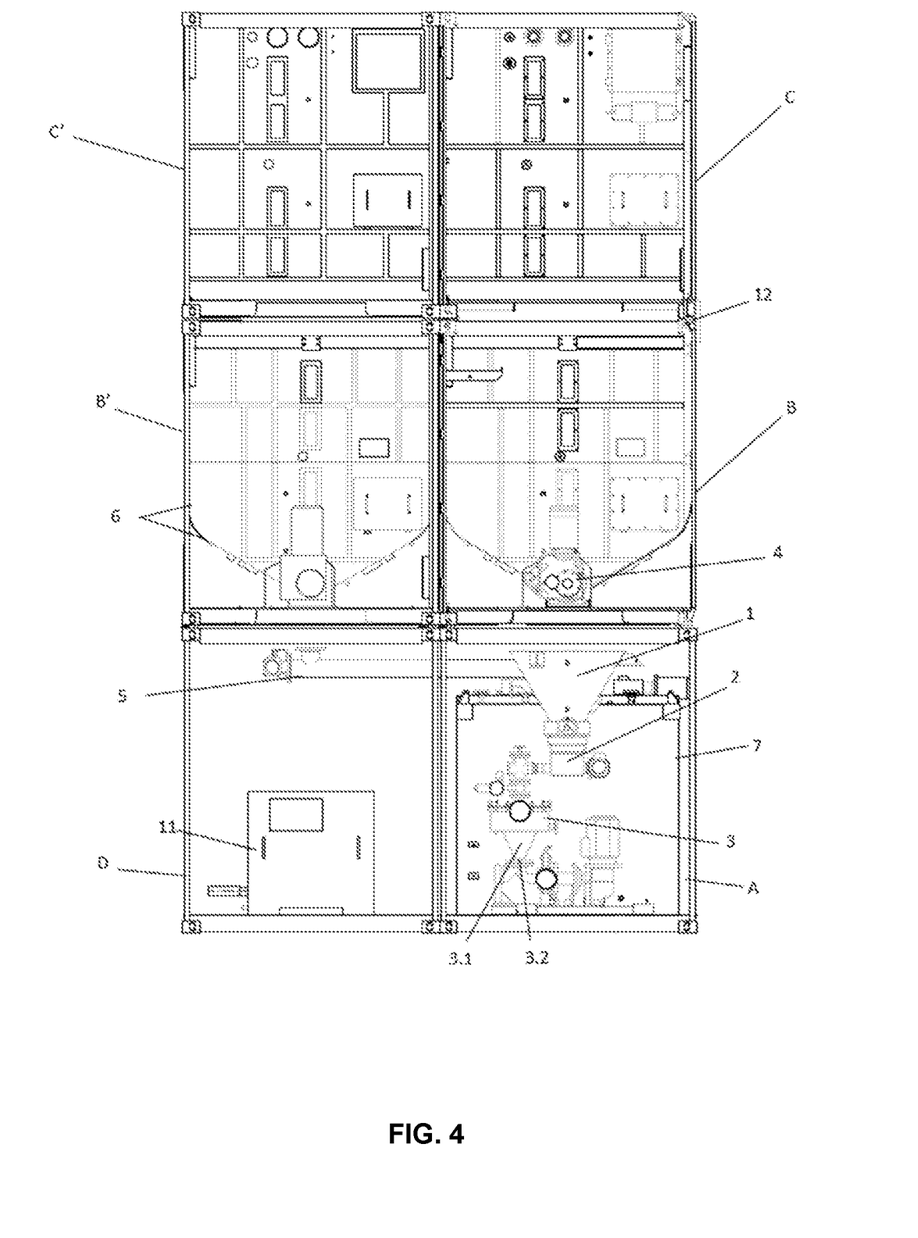
FIG. 4 is a cross-section of FIG. 3.

In the embodiment as shown in FIGS. 3 and 4, the installation, according to the invention comprises a management container D.

Storage and distribution container D is an intermodal container like dissolution container A, and therefore, it has the same characteristics.

Management container D is usually positioned next to it, along one of the long sides, to dissolution container A, i.e., adjacently.

In one particular mode of the invention, containers A and D communicate so as to form only one large container. In other words, they are devoid of their adjacent sidewall. In this case, management container D comprises the control room (11) described above.

In the embodiment as shown in FIGS. 3 and 4, the adjacent wall of container A has at least one opening communicating with at least one opening placed in the adjacent wall of container D, to allow, by means of the removable part of the bottom of the container B' and a means of connection (5), the passage of the polymer from container B' into at least one of container A's means of supply (1).

The invention may comprise additional storage containers, which may contain the same equipment as the storage containers described previously, and which may be placed according to the same arrangements according to field requirements.

In one preferred embodiment according to the invention, the installation consists of one container A and two containers B and C. Container B is then placed in contact with the upper part of container A, and container C is placed in contact with the upper part of container B, as previously described.

In another preferred embodiment according to the invention, the installation consists of one container A, one container D, or one structure capable of supporting the weight of containers B' and C', and containers B, B', C, and C'. They are then arranged as described previously.

The storage containers may be supplied with polymer, for example, and in a non-limiting way, manually, i.e., by unloading bags filled with polymer or using a pneumatic system from truck-tank or storage containers.

In a configuration in which containers B and B' are positioned adjacently, the containers are either alternately fed with polymer by two distinct systems or by the same system (13) for distributing the multi-channel type powder, thanks to a diverter or any other referral or transfer line selection system.

In one particular embodiment, storage container(s) (B, B', C, and C') may be positioned directly filled with polymer.

In one embodiment according to the invention, it is containers C and/or C', which are directly positioned filled with polymer.

In one particular embodiment, the installation according to the invention may further comprise one, several, or all of the following elements:
- at least one additive storage tank, which may be placed in the dissolving container or outside;
- at least one additional means for pumping and metering these additives either into the polymer dissolution device or through a pipe from the volumetric metering pump, which may be placed in the dissolution container or outside;
- a means for measuring the amount of water-soluble polymer present in the storage container(s);
- a means of controlling the filling level in the storage container(s);
- an outer casing used to protect the walls of the various containers from excessive overheating;
- means for anchoring the dissolution container and/or the management container to the ground that is capable of withstanding the snow and wind conditions in the installation and operating zone of the installation.

The term "additional additives" denotes all the additives generally used in enhanced oil and/or gas recovery operations. Mention may be made, for example, of crosslinking agents, crosslinking agents with a delayed effect, surfactants, demulsifiers, anti-tartar agents, anti-corrosion agents, bactericides, and oxidants.

Those skilled in the art will be able to vary the different parameters of the equipment to adapt them to the specific field conditions while maintaining the desired goal. In particular, containers, a means of dissolving water-soluble polymer, or screws of different sizes according to field needs may be used.

This invention, therefore, makes it possible to facilitate the transport and storage of water-soluble polymer in the field while being flexible enough to meet the needs of industrialists.

Due to the installation of the invention, it is possible to store large quantities of polymer, up to 160 tons or even more, while greatly limiting the footprint of the installations and ensuring good dissolution of a water-soluble polymer, making it possible to prevent a negative impact from the enhanced oil and/or gas recovery process.

The installation of the invention is also easily modular and adaptable to all fields, whether on land or at sea, and in general greatly facilitates the transport of equipment necessary for polymer storage, metering, dissolution, and injection.

The installation according to the invention may be used for all kinds of operations, such as the enhanced recovery of oil and/or gas, hydraulic fracturing, or the treatment of mining residues, or else the treatment of mining residues of bituminous sands, known in particular as mature fine tailings (MFTs).

The invention claimed is:

1. An installation for storing, metering, and dissolution of water-soluble polymer particles, comprising: a container A of a generally parallelepipedic shape comprising side walls forming long and short sides, a bottom and a roof, wherein said container A comprises at least one supply of the polymer, at least one metering mechanism of the polymer and at least one mechanism for dissolving the metered polymer, characterized in that the installation further comprises at least one container B of a generally parallelepiped shape positioned on said container A, comprising side walls forming long and short sides and a bottom, wherein said side walls and said bottom of said container B are contiguous and enclosed so as to be adapted to contain particles of the polymer therein, and wherein the bottom of said container B and the roof of said container A each have an opening facing each other, allowing the passage of polymer from said container B into the at least one supply of the polymer from said container A, wherein the bottom of said container B comprises a mechanism for setting the polymer in motion in the form of a horizontal screw, wherein the installation further comprises a connection mechanism capable of working with the at least one supply of the polymer.

2. The installation according to claim 1, further comprising an additional container C, comprising sidewalls that form long and short sides and a roof; said container C being, at the least, partially devoid of a bottom; said container B having no roof; said container C being positioned on top of said container B.

3. The installation according to claim 1, further comprising an additional container B' that is strictly identical to said container B, the containers B and B' being positioned side by side, along their long sides.

4. The installation according to claim 1, further comprising three additional containers respectively:
an additional container B' identical to said container B, the containers B and B' being positioned side by side along their long sides, and
two additional containers C and C', the containers C and C' comprising side walls forming long and short sides and a roof, and being at least partially devoid of a bottom, the containers C and C' being respectively positioned on the containers B and B', so as to allow the transfer of the polymer from the containers C and C', to the containers B and B' for storage and distribution.

5. The installation according to claim 3, further comprising a management container D or a structure capable of supporting the weight of said container B' located next to said container A.

6. The installation according to claim 3, characterized in that one of the sidewalls of said container A has an opening communicating with the opening situated in the bottom of said container B' through a connection mechanism adapted to allow the passage of the polymer from the container B' into the at least one supply of said container A.

7. The installation according to claim 1, characterized in that the containers have a net weight of between 1 to 20 tons and a dimension of 6 to 12 meters by 2.4 meters by 2.6 meters high without frame.

8. The installation according to claim 1, characterized in that the supply of the polymer is in the form of a hopper and the metering mechanism of the polymer is in the form of a metering screw.

9. The installation according to claim 1, characterized in that the mechanism for dissolving the metered polymer is a water-soluble polymer grinding dispersion device and comprises:
a water-soluble particle polymer wetting cone connected to a primary water supply circuit,
at a lower end of the cone, a grinding and drainage chamber for the dispersed water-soluble polymer comprising:
a rotor driven by a motor and equipped with knives,
a fixed stator made of a cylinder with fine slots,
on all or part of the periphery of the chamber, a ring fed by a secondary water circuit, the ring communicating with the chamber in such a way as to ensure the spraying of water under pressure on an outside of the stator, thus allowing the release of crushed and swollen water-soluble polymer on a surface of said stator.

10. The installation according to claim 1, characterized in that the mechanism for dissolving the metered polymer has a flow rate of between 5 and 3000 kg/h of polymer powder.

11. The installation according to claim 1, characterized in that the at least one container B is provided with self-cleaning filters.

12. The installation according to claim 4, characterized in that the containers B and C, and the containers B' and C' are hermetically connected.

13. The installation according to claim 1, characterized in that the at least one container B comprises a mechanism to prevent the water-soluble polymer from accumulating and remaining stuck to the walls.

14. A process for producing a water-soluble polymer solution using the installation that is the subject-matter of claim 1 and comprising the following steps:
water-soluble polymer in powder form is fed into polymer storage-only container C, or into polymer storage and distribution container B by a supply mechanism;
the water-soluble polymer is then set in motion by the horizontal screw located at the bottom of said storage and distribution container B;
the water-soluble polymer then passes through the opening in the bottom of storage and distribution container B and the opening in the roof of dissolution container A;
the water-soluble polymer is found in the supply mechanism and then passes through the metering mechanism;
the water-soluble polymer is then sent to the dissolving mechanism;
the water-soluble polymer then passes through a hydration and dissolution tank equipped with a stirring system; and
finally, the water-soluble polymer is fed into a volumetric metering pump which meters the water-soluble polymer solution to be mixed with the injection fluid.

15. A process for enhanced oil and/or gas recovery comprising the following steps:
storage, metering, and dissolution of a water-soluble polymer in the system, which is the subject-matter of claim 1,
preparation of an injection fluid comprising at least said water-soluble polymer and water or brine,
injection of the injection fluid into an underground formation,
sweeping the underground formation with the injection mechanism, and
recovery of an aqueous and hydrocarbon mixture.

* * * * *